Oct. 21, 1952  F. H. PARKER  2,614,851
MIXING VALVE
Filed June 15, 1949  3 Sheets-Sheet 1

INVENTOR.
FRANK H. PARKER
BY
Frank H. Harmon
ATTORNEY

Oct. 21, 1952  F. H. PARKER  2,614,851
MIXING VALVE

Filed June 15, 1949  3 Sheets-Sheet 2

INVENTOR.
FRANK H. PARKER
BY
*Frank N. Harmon*
ATTORNEY

Oct. 21, 1952  F. H. PARKER  2,614,851
MIXING VALVE

Filed June 15, 1949  3 Sheets-Sheet 3

INVENTOR.
FRANK H. PARKER
BY
Frank H. Harmon
ATTORNEY

Patented Oct. 21, 1952

2,614,851

UNITED STATES PATENT OFFICE 2,614,851

MIXING VALVE

Frank H. Parker, Cleveland Heights, Ohio, assignor of one-half to Stephen C. Peplin, doing business as Lakewood Manufacturing Co., Westlake, Ohio Application June 15, 1949, Serial No. 99,145

4 Claims. (Cl. 277—18)

This invention relates in general to mixing valves and more particularly to improvements in combination hot and cold water faucets and shower attachments.

One of the primary objects of the invention is to provide such a faucet, having a single discharge outlet, with manual control means whereby, with the simple manipulation with the same hand, the operator may control the proportion of flow of hot and cold water, even to the exclusion of each other, and also control the over-all pressure volume of flow through the discharge outlet.

Another object is to so combine such manual control as to be convenient for operation by one hand and at the same time so independent of each other as to not interfere with each other either as to manual control or in their own functions.

Another object is to provide in such a faucet a mixing valve means with an automatic sealing means for preventing mixture of hot water flow in the cold water pressure line, or vice versa, regardless of prevailing differential pressures in the two lines.

A further object is to provide such a faucet in which all parts, including operating stems, valves and valve seats may be installed, removed and replaced with the maximum of ease.

A still further object is to provide in such a construction an arrangement whereby forces exist tending to close the mixture and volume control valves but controllable by the respective manual controls to open the valves to any degree of adjustment.

Figure 2:
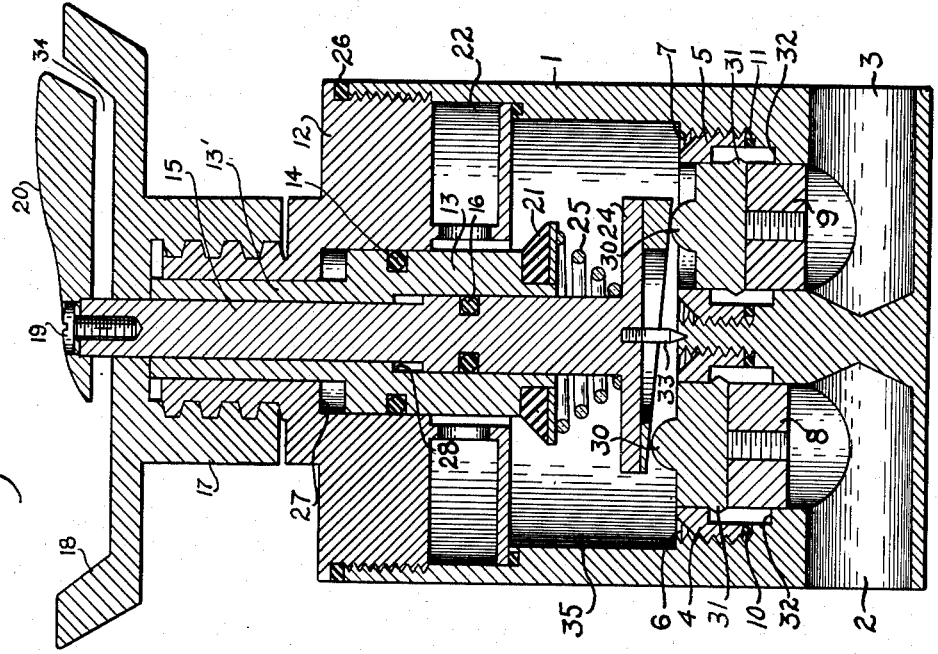
Figure 2 is a similar view showing the same setting of the auxiliary valves and the main valve open.
Figure 1:
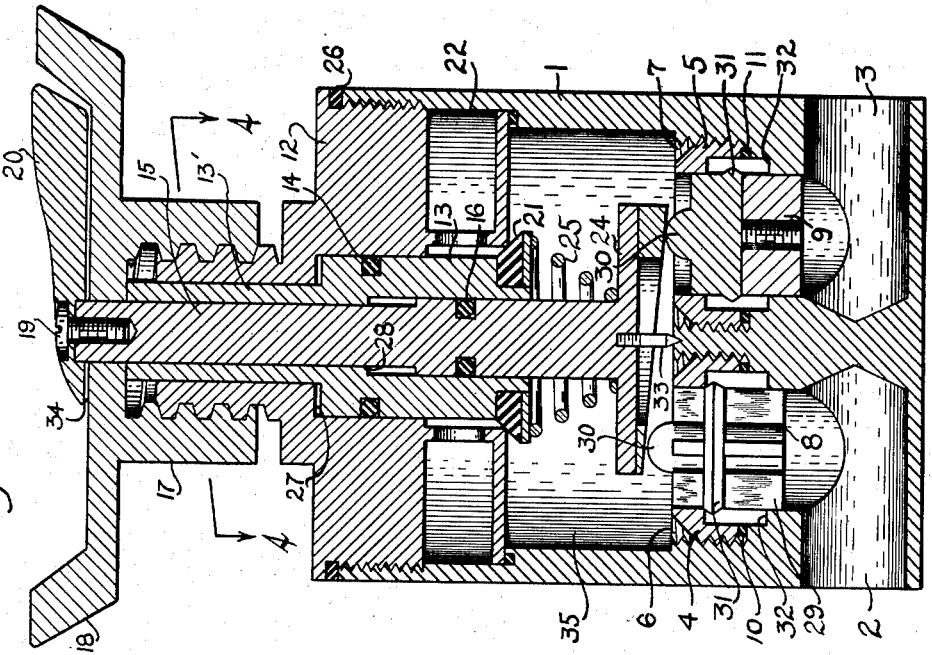
Figure 1 is a view in vertical section taken through a faucet showing one form my invention may take and showing the main volume control valve open and one of the auxiliary mixing valves open and the other closed.
Figure 5:
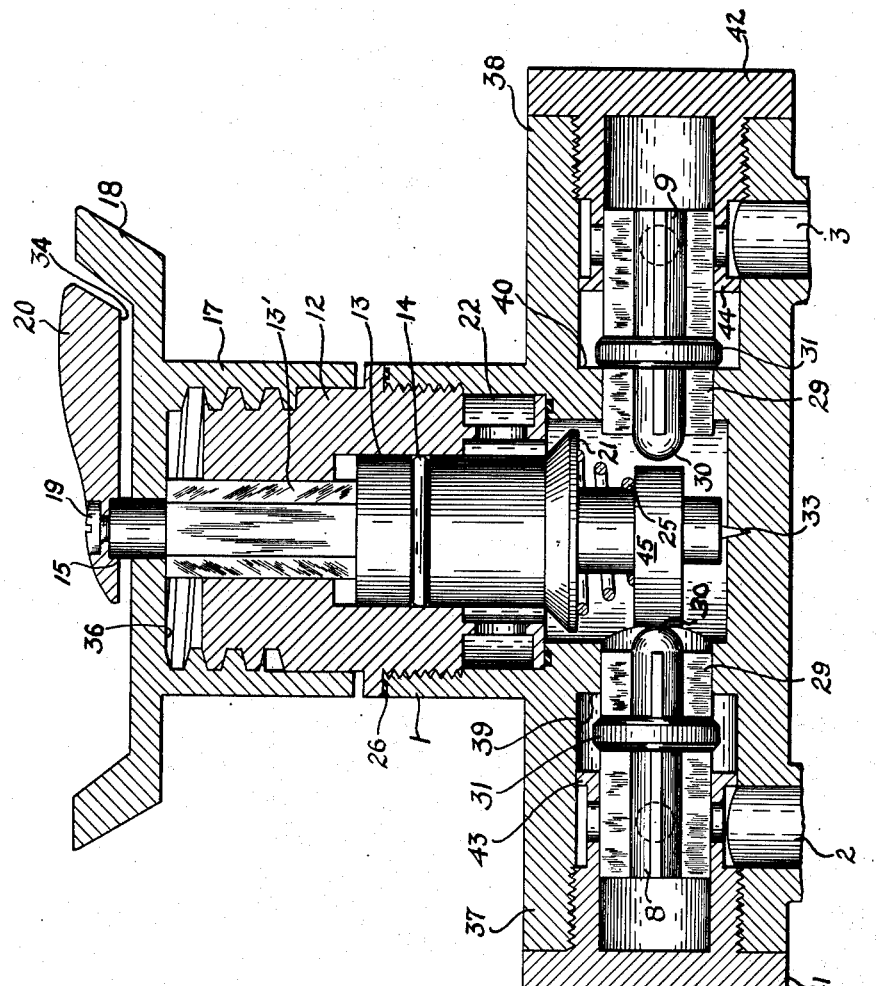
Figure 5 is a view in vertical section through another form of my invention where the auxiliary mixing valves are horizontally disposed.

Referring more particularly to the drawings, I have shown in Figures 1 to 4, inclusive, and more especially in Figures 1 and 2, one form my invention may take which is particularly suitable for ordinary faucets, while that form shown in Figure 5 may be more particularly suitable as a shower attachment.

Referring more particularly to the drawings, the faucet, as shown in Figures 1 and 2, includes a casing 1 provided with passages 2 and 3 communicating respectively with a hot and a cold water pressure line. With the top of casing 1 being open, I may easily insert screw threaded valve seats 4 and 5 in screw threads 6 and 7 in the casing. Actually, auxiliary, or mixing, valves 8 and 9 are installed simultaneously with their plug seats 4 and 5. The plug seats 4 and 5 may be provided with packing seals 10 and 11. The top end of the casing is internally screw-threaded to receive a closure plug 12.

This closure plug 12 is bored to receive a slidable tubular sleeve 13, having its upper reduced portion 13' of hexagonal cross section, and provided with a packing ring 14. Sleeve 13 is bored to receive a round rotatable stem 15 provided with a packing ring 16. Plug 12 has its upper portion externally threaded to receive a barrel 17 which surrounds stem 15 and rests on top of sleeve 13. Integral with barrel 17 is a multi-pronged handle 18. Removably secured to the top of rod 15 by a set screw 19 is a single prong handle 20. The bottom of sleeve 13 carries a main closure valve 21 for the discharge chamber 22 which communicates with outlet pipe 23. Integral with the bottom of stem 15 is a cam 24 and between the same and main valve 21 is a compression coil spring 25. With these parts installed in plug 12, the latter is screw-threaded into the upper open end of casing 1 against the packing ring 26.

Each auxiliary valve, 8 and 9, is of the floating, or shuttle, type having radial fins 29, a top button 30 and a solid closure disc 31. The valve is so installed that its closure disc is disposed for movement between its plug seat, 4 or 5, and its bottom seat 32 which is a part of the casing.

Compression coil spring 25 simultaneously exerts an upward pressure on main valve 21 toward its seat and a downward pressure on cam 24. Cam 24 is provided with an adjustable centering pin 33 which engages a suitable detent in the casing. This pin is so adjusted that the bottom of the cam disc 24 may contact the buttons of the auxiliary valves 8 and 9 and yet leave proper clearance 34 between the operating handles 18 and 20 at all times so that the two may be operable independently of each other without binding. As shown in Figures 1 and 2, clearances are provided between shoulder 27 of plug 12 and the adjacent shoulder of sleeve 13 and also between internal shoulder 28 of sleeve 13 and the adjacent shoulder of stem 15 to permit vertical adjustment of sleeve 13 with respect to stationary plug 12 and rotatable stem 15.

Normal pressure in the hot and cold water pressure lines urges auxiliary shuttle valves 8 and 9, respectively, toward their plug seats 4 and 5 to close communication from the lines to a mixing chamber 35, the communication of which with the discharge chamber 22 is regulated by main valve 21.

As shown in Figures 1 and 2, the cam 24, being integral with rotatable stem 15, is in the form of a circular disc with a cammed bottom and a flat top, the thickness of the disc progressively varying from a maximum thickness to a minimum thinness.

In operation, the main valve 21 may be left closed, as shown in Figure 1, while handle 20 is rotated along a suitable scale to a desired mixture of hot and cold water. As handle 20 is rotated the cam 24, which embraces the top buttons of both auxiliary valves, proportionally forces one valve down to open position against water pressure while permitting the other to move toward closing position against its plug seat. In the illustration of Figure 1, an extreme adjustment is shown wherein valve 8 completely closes hot water flow to the mixing chamber while valve 9 is open to permit cold water flow into the mixing chamber 35. It is to be understood that the cold water line may be similarly closed while the hot water line is opened, and that any desired mixture of the two may be obtained by rotatable adjustment of the handle 20 and consequently its cam 24. As stated before, a rotation of handle 20 and cam 24 is entirely independent of sleeve 13 and handle 18 and has no effect on the operation of the main volume control valve 21.

Having made proper adjustment for hot and cold water mixture, the next step may be to rotate handle 18 for volume discharge control. Rotation of handle 18, in the proper direction to open main valve 21, causes the inner flange 36 of barrel 17, which rests on the top of the hexagonal sleeve 13', to force the latter and its integral sleeve 13 downwardly against the action of spring 25 to open main valve 21, as shown in Figure 2. This operation of hande 18, main valve 21 and its sleeve 13 is likewise entirely independent of handle 20, stem 15, cam 24 and the auxiliary valves 8 and 9. The adjustment of main valve 21 controls the volume of flow from mixing chamber 35 to discharge chamber 22 and out through discharge spout 23. It is to be understood that even while the main valve 21 is open, as shown in Figure 2, adjustment may be made of the cam 24 to change the proportion of hot and cold water mixture.

In order to make my invention suitable for all purposes I may slightly modify the construction of Figures 1 and 2, which is particularly suitable for faucets, to a form shown in Figure 5, which may be more suitable for shower attachments. The main point of difference in construction lies in the horizontal disposition of the two auxiliary shuttle mixing valves, the construction of the cam and the installation of these valves in the casing.

In Figure 5 the installation of the two handles, sleeve 13 and stem 15 into plug 12 and the latter into casing 1 is essentially the same. The installation of the two auxiliary valves 8 and 9, which are horizontally disposed, is different. The casing has two horizontal hollow extensions 37 and 38 to be in communication with hot and cold water pressure lines 2 and 3, respectively. The two valves 8 and 9 are first inserted through the open ends of extentions 37 and 38 toward casing seats 39 and 40, after which screw plugs 41 and 42, carrying plug seats 43 and 44, are screwed into the extension ends. The cam 45, instead of being a cammed bottom disc, is an edge cam rigid with rotatable stem 15. Pressure in lines 2 and 3 tends to urge valves 8 and 9 inwardly toward their casing seats 39 and 40 to close communication between lines 2 and 3 and the mixing chamber 35. Rotation of handle 18 independently operates main valve 21 for volume discharge control. Rotation of handle 20 and its stem 15 rotates cam 45, whose cam edge operates the two valves 8 and 9 in the same manner as the cammed bottom disc 24 of Figures 1 and 2. In the particular example shown in Figure 5, the hot water line is open, the cold water line closed and the volume control valve 21 open for discharge flow of hot water.

In both modifications, whether that of Figure 1 or 5, an important feature of my invention is the provision of means for preventing mixture of hot water in the cold water line, or vice versa, should the pressures in the two lines suddenly vary in proportion. Should this occur in my device, the auxiliary shuttle valve regulating the line in which the pressure drop occurs will be forced against its seat adjacent the inlet of the line by the relatively greater pressure of the other line to prevent flow of hot water into the cold water line, or vice versa.

In both modifications, simplicity of construction and ease of installation, removal and replacement of parts has been emphasized. Also there has been emphasized the fact that the two handles 18 and 20 are conveniently adjacent for single hand operation but entirely independently for independent adjustment of hot and cold water mixture and volume discharge control.

Figure 3:
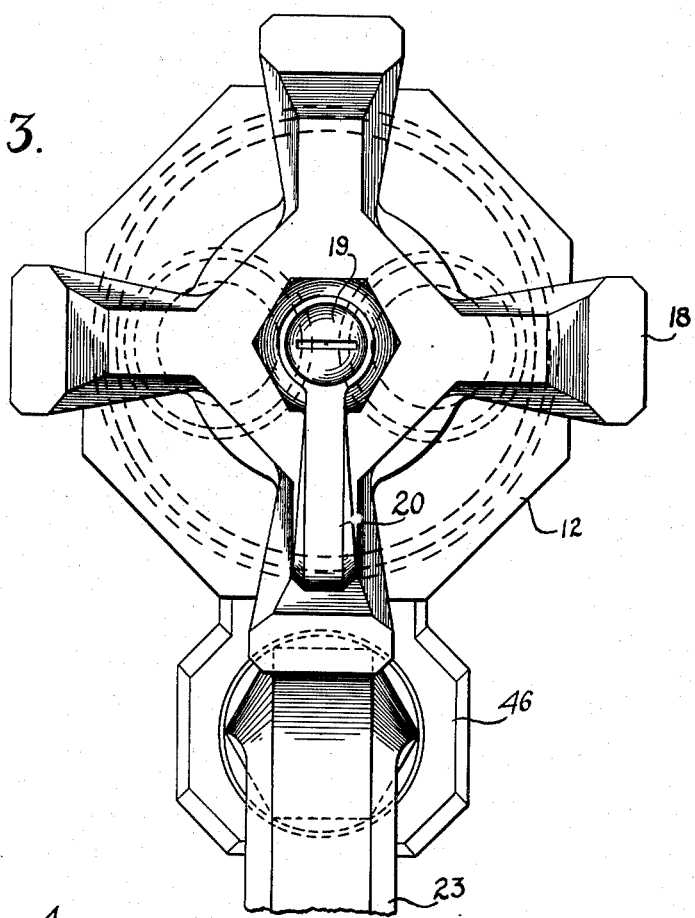
Figure 3 is a top plan view of the faucet showing the two operating handles and the swivel outlet pipe.
Figure 4:
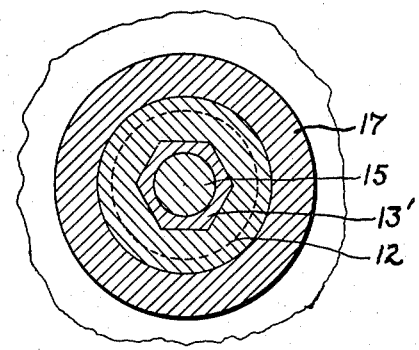
Figure 4 is a view in section taken along line 4—4 of Figure 1.

As shown in Figure 3, the outlet nozzle may be suitably swiveled, if desired, in a mount 46 forming part of the casing.

I claim:

1. In a faucet having a casing, a mixing chamber and a discharge chamber communicating therewith, a pair of fluid pressure lines leading to said mixing chamber and a common outlet from said discharge chamber, a pair of auxiliary valves, one between each of said pressure lines and said mixing chamber and a main valve between said mixing chamber and discharge chamber, a pair of independently manually operable controls, one for operating said pair of auxiliary valves for regulating the proportion of fluid flow from said lines into said mixing chamber and the other manual control for operating said main valve to control the volume of discharge outlet fluid flow, said manual controls comprising rotatable handles adjacently arranged for reciprocably adjusting said main valve and a rotatable stem arranged concentrically of the stem of said main valve and operated by the other handle for reciprocably adjusting said auxiliary valves, the stem for operating said auxiliary valves including a rotatable cam adapted to engage both of said auxiliary valves to simultaneously open said valves in differing degrees, resilient means interposed between said cam and said main valve for urging said main valve toward closed position and said cam into engagement with said auxiliary valves.

2. In a faucet having a casing, a mixing chamber and a discharge chamber communicating therewith, a pair of fluid pressure lines leading to said mixing chamber and a common outlet from said discharge chamber, a pair of auxiliary valves, one between each of said pressure lines and said mixing chamber and a main valve between said mixing chamber and discharge chamber, a pair of independently manually operable controls, one for operating said pair of auxiliary valves for regulating the proportion of fluid flow from said lines into said mixing chamber and the other manual control for operating said main valve to control the volume of discharge outlet fluid flow, said manual controls comprising rotatable handles adjacently arranged for reciprocably adjusting said main valve and a rotatable stem arranged concentrically of the stem of said main valve and operated by the other handle for reciprocably adjusting said auxiliary valves, the stem for operating said auxiliary valves including a rotatable cam adapted to engage both of said auxiliary valves to simultaneously open said valves in differing degrees, resilient means interposed between said cam and said main valve for urging said main valve toward closed position and said cam into engagement with said auxiliary valves, said main valve being urged toward its seat by existing fluid pressure in said mixing chamber.

3. In a faucet having a casing, a mixing chamber and a discharge chamber communicating therewith, a pair of fluid pressure lines leading to said mixing chamber and a common outlet from said discharge chamber, a pair of auxiliary valves, one between each of said pressure lines and said mixing chamber and a main valve between said mixing chamber and discharge chamber, a pair of independently manually operable controls, one for operating said pair of auxiliary valves for regulating the proportion of fluid flow from said lines into said mixing chamber and the other manual control for operating said main valve to control the volume of discharge outlet fluid flow, said manual controls comprising rotatable handles adjacently arranged for single hand operation, a reciprocable valve stem operated by one handle for reciprocably adjusting said main valve and a rotatable stem arranged concentrically of said main valve stem and operated by the other handle for reciprocably adjusting said auxiliary valves, each of said auxiliary valves being of the floating shuttle type mounted for limited movement between a pair of opposed seats and normally urged by pressure in its pressure line to engage one seat to close flow from its line to said mixing chamber and adapted upon drop in pressure in that line to engage its other seat to close communication between said pressure line and the other pressure line, the stem for operating said auxiliary valves including a rotatable cam adapted to engage both of said auxiliary valves to simultaneously open said valves in differing degrees, resilient means interposed between said cam and said main valve for urging said main valve toward closed position and said cam into engagement with said auxiliary valves.

4. In a faucet having a casing, a mixing chamber and a discharge chamber communicating therewith, a pair of fluid pressure lines leading to said mixing chamber and a common outlet from said discharge chamber, a pair of auxiliary valves, one between each of said pressure lines and said mixing chamber and a main valve between said mixing chamber and discharge chamber, a pair of independently manually operable controls, one for operating said pair of auxiliary valves for regulating the proportion of fluid flow from said lines into said mixing chamber and the other manual control for operating said main valve to control the volume of discharge outlet fluid flow, said manual controls comprising rotatable handles adjacently arranged for single hand operation, a reciprocable valve stem operated by one handle for reciprocably adjusting said main valve and a rotatable stem arranged concentrically of the stem of said main valve and operated by the other handle for reciprocably adjusting said auxiliary valves, each of said auxiliary valves being of the floating shuttle type mounted for limited movement between a pair of opposed seats and normally urged by pressure in its pressure line to engage one seat to close flow from its line to said mixing chamber and adapted upon drop in pressure in that line to engage its other seat to close communication between said pressure line and the other pressure line, the stem for operating said auxiliary valves including a rotatable cam adapted to engage both of said auxiliary valves to simultaneously open said valves in differing degrees, resilient means interposed between said cam and said main valve for urging said main valve also toward closed position and said cam into engagement with said auxiliary valves, said main valve also being urged toward its seat by existing fluid pressure in said mixing chamber.

FRANK H. PARKER.

REFERENCES CITED

The following references are of record in the file of this patent:

UNITED STATES PATENTS

| Number | Name | Date |
| --- | --- | --- |
| 816,133 | Speakman | Mar. 27, 1906 |
| 993,806 | Taylor | May 30, 1911 |
| 1,577,355 | Polfy | Mar. 16, 1926 |
| 1,886,889 | Krupp | Nov. 8, 1932 |
| 2,045,308 | Wolff | June 23, 1936 |

FOREIGN PATENTS

| Number | Country | Date |
| --- | --- | --- |
| 143,911 | Switzerland | Nov. 30, 1930 |